Nov. 15, 1932.       H. G. WEYMOUTH       1,887,609
              LIQUID DISPENSING SYSTEM
              Filed Nov. 1, 1929    2 Sheets-Sheet 1
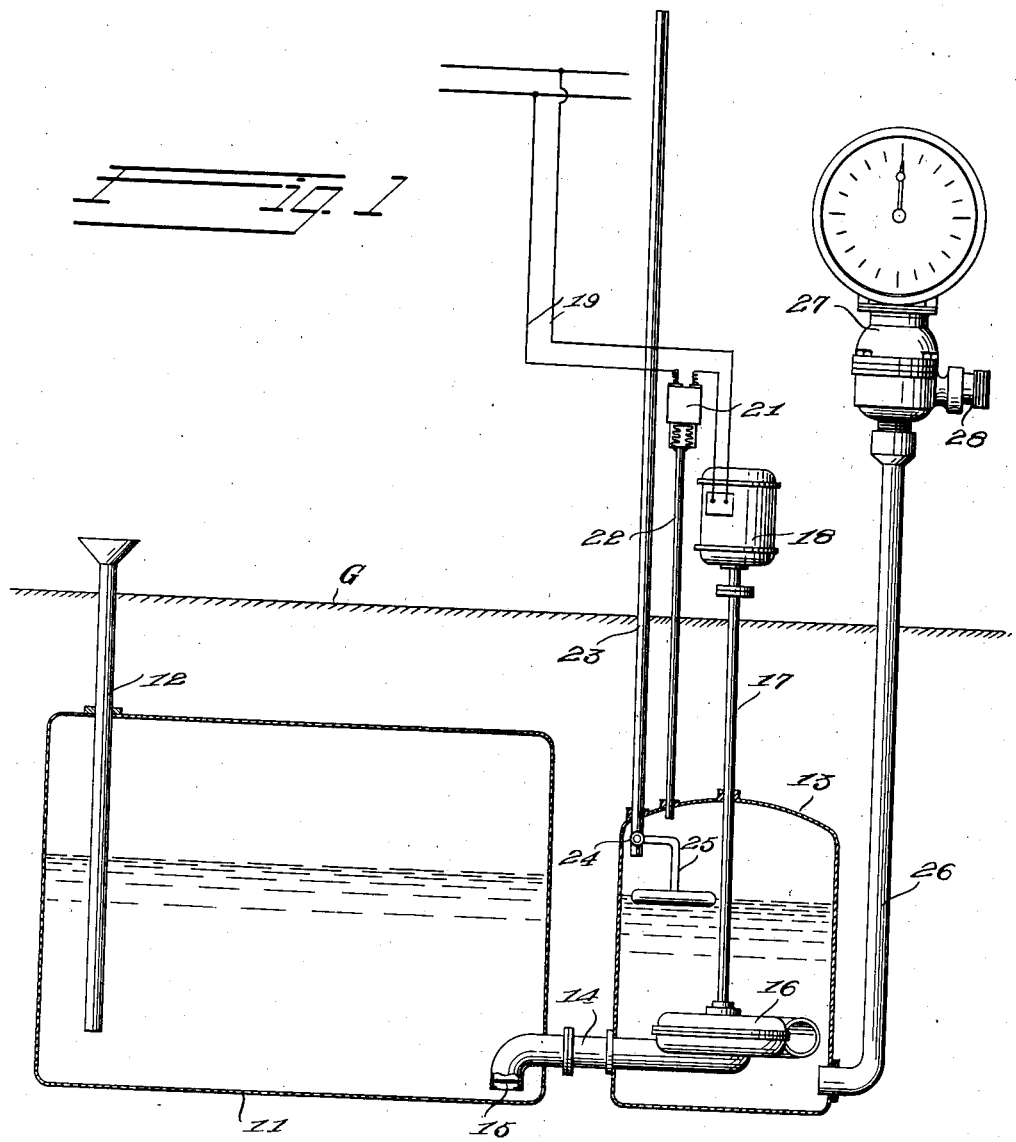
Inventor
Harry G. Weymouth
By Strauch & Hoffman
Attorneys

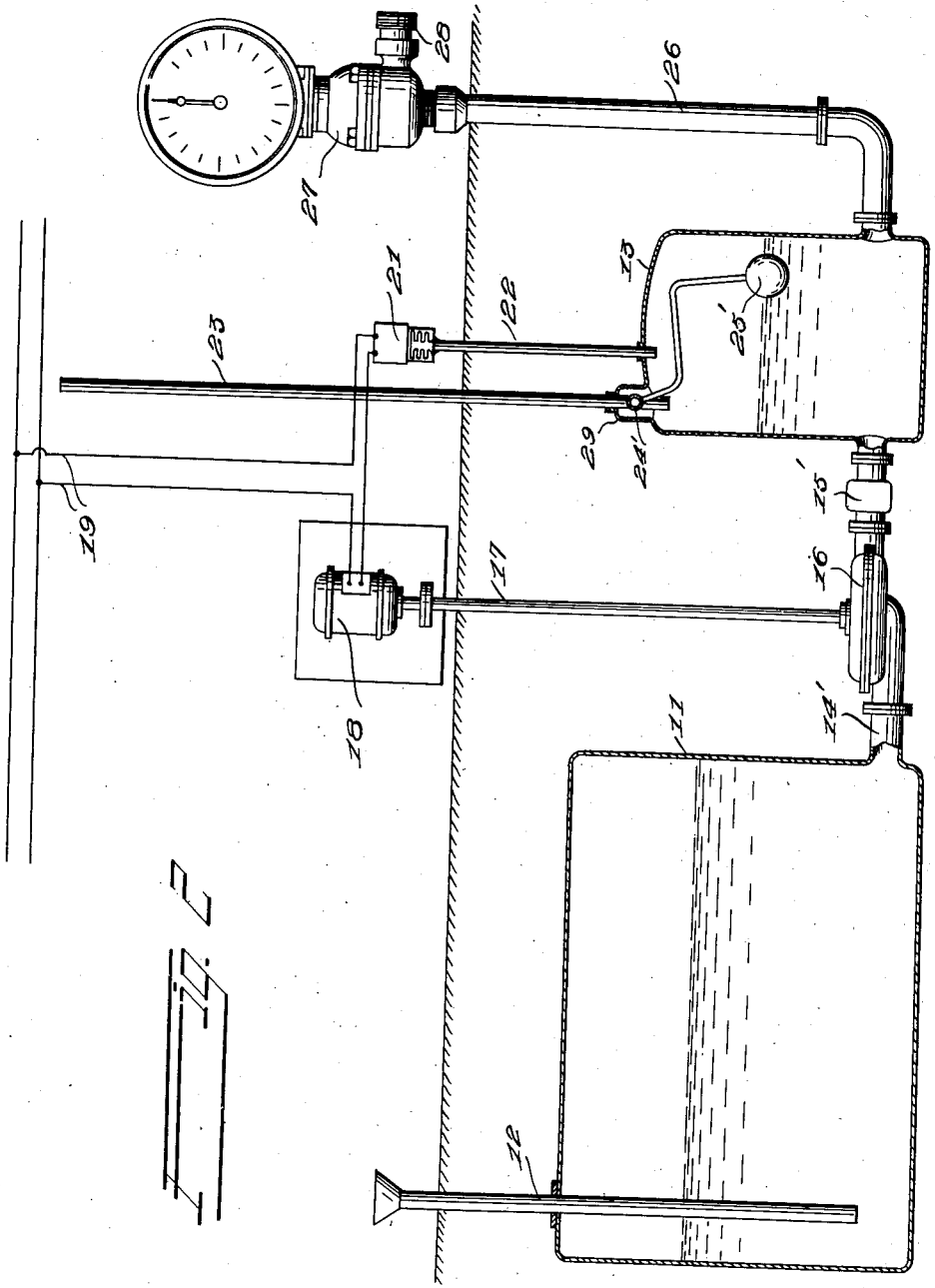

Patented Nov. 15, 1932                                                                1,887,609

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

LIQUID DISPENSING SYSTEM

Application filed November 1, 1929. Serial No. 404,040.

The present invention relates to a liquid dispensing system.

More specifically, the invention relates to a system for dispensing gasoline or other liquid in arrangements embodying a closed delivering tank for causing the flow of gasoline under the action of pneumatic or similar fluid pressure.

Systems of this general character are now in use but are not entirely satisfactory due to the fact that air is mixed in the gasoline when it is dispensed, thus resulting in the delivery of a quantity of gasoline less than the amount indicated by the meter varying in proportion to the amount of air carried with the gasoline.

It is a primary object of the present invention to provide a gasoline or similar liquid dispensing system comprising a pressure delivery tank provided with an outlet delivery pipe in communication with a meter, that has mechanism associated with the tank for automatically maintaining a constant fluid pressure as well as a constant volume of fluid in said tank.

It is a further object of the invention to provide a gasoline dispensing system comprising a storage tank, a delivery tank in communication with said storage tank, fluid pressure increasing means in said delivery tank, a delivery pipe provided with a meter in communication with said delivery tank, and means associated with said delivery tank for automatically operating said pressure increasing means for maintaining a constant delivery pressure in said delivery tank without increasing the volume of fluid in the delivery tank.

A still further object of the invention is to provide a gasoline dispensing system comprising a storage tank open to atmosphere, a closed delivery tank in communication with said storage tank, an outlet pipe provided with a meter in communication with said delivery tank, means for forcing gasoline from said storage tank into said delivery tank for increasing the pressure therein for delivering gasoline therefrom under pressure, and means associated with said delivery tank for automatically regulating the operation of said means so as to maintain a constant fluid pressure and fluid volume in said delivery tank without discharging the fluid through the meter.

A still further object of the invention is to provide a gasoline dispensing system comprising a delivery tank, means for drawing gasoline into said tank for increasing the fluid pressure therein for forcing gasoline from said tank, and including means associated with said tank for automatically venting same when the volume of fluid exceeds a predetermined value.

A still further object of the invention is to provide a gasoline dispensing system comprising a storage tank, a delivery tank in communication with said storage tank, a pump for forcing gasoline from said storage tank into said delivery tank for increasing air or fluid pressure therein for forcing gasoline from said delivery tank under air or fluid pressure, a motor for operating said pump, a float operated air vent associated with said delivery tank, a pressure regulator operatively connected with said motor and in communication with said pressure tank, so that excess air carried by gasoline from said storage tank is vented from said delivery tank and so that said pump is set into operation by said regulator when the pressure drops in said delivery tank, whereby gasoline is forced from said delivery tank under a substantially constant air pressure therein without entrained air and whereby accumulations of air beyond a predetermined volume are automatically removed from the system by said vent.

With these objects in view as well as others that will become apparent during the course of the following disclosure reference will be had to the accompanying drawings forming part of same and wherein:

Fig. 1 is a vertical sectional view with parts in elevation disclosing a gasoline delivering system constructed in accordance with a preferred embodiment of my invention.

Fig. 2 is a view similar to Fig. 1 disclosing a modified embodiment of the invention.

Referring to the drawings by reference characters, in which like characters designate like parts, and referring first to Fig. 1, 11 designates a gasoline storage tank, which may be of any desired construction and capacity, and which is preferably disposed below the ground indicated at G. The tank 11 is provided with a suitable filling pipe 12 projecting to the surface or above the ground, as indicated, whereby gasoline may be admitted to tank 11 for dispensing by the system hereinafter disclosed. Also disposed beneath the ground in adjacency to tank 11 is a delivery tank 13, which is in communication with tank 11 through a suction pipe 14. Said pipe is provided with a check valve 15 disposed in tank 11. Said pipe is in communication with a centrifugal pump 16 in tank 13 for drawing gasoline from tank 11 through suction pipe 14 into tank 13 to cause air pressure above the gasoline in tank 13 to build up sufficiently for forcing same therefrom through the delivery connections hereinafter referred to.

The pump 16 has associated therewith a drive shaft 17 operatively connected above the ground G to a motor 18, which motor is in connection with an electric source by the conductors indicated at 19. A suitable switch, operable through a pressure regulator 21, which is in communication with tank 13 through a pipe 22, serves to control the operation of the motor, by opening the switch when the pressure in tank 13 reaches a predetermined value and by closing said switch to cause operation of the motor when the pressure falls below said value.

Communicating with tank 13 is one end of an air vent pipe 23, in which is disposed a valve 24 operable by a float 25 disposed within tank 13 and subject to movement in accordance with variation of the level of the gasoline therein.

Communicating with tank 13 adjacent the bottom thereof is an outlet or delivery pipe 26 which is in communication with a meter 27, provided with a connection 28 for the reception of the adjacent end of a delivery nozzle.

In operation of the construction just described, the pump 16 operated by motor 18 draws gasoline through suction pipe 14 into the delivery tank 13 causing the air pressure within tank 13 above the gasoline therein to build up thus forcing gasoline from tank 13 through pipe 26 and meter 27 to a point of delivery upon opening the usual nozzle controlling valve. Any air or gas carried in suspension by the gasoline pumped from the tank 11 is freed within tank 13 causing an increased air volume therein. As the air volume increases the level in tank 13 drops, resulting in lowering of float 25 and opening of valve 24, thus automatically venting the air to atmosphere through vent pipe 23. When the air is vented in the manner disclosed the pressure within tank 13 drops, affecting the pressure regulator 21, which is in communication with said tank. Said regulator closes the switch in circuit 19 and thus starts the motor 18. Consequently pump 16 is set in action raising the level in tank 13 causing float 25 to be raised to close the air vent control valve 24. The air pressure in the tank 13 then builds up and causes the regulator to stop motor 18.

Thus it will be seen that with the construction disclosed a substantially constant operating air volume and pressure is automatically maintained within tank 13 with a substantially constant level of gasoline therein irrespective of the amount of air or gas carried in suspension by the gasoline accumulating within tank 13, thus positively avoiding the passage of any air with the gasoline from tank 13 through meter 27. In other words, gasoline entirely free from admixture with air is delivered through meter 27 under a substantially constant air pressure within tank 13, thus insuring the delivery of gasoline in the quantities indicated by meter 27.

In Fig. 2 is disclosed a construction similar to that disclosed in Fig. 1, but modified in the following particulars. In accordance with this form of the invention the pump 16 instead of being located within tank 13 as in the first form of the invention is disposed between tanks 11 and 13 and the suction pipe 14' has disposed therein a check valve 15, which is arranged between tank 13 and the pump 16 where both pump and check valve are readily accessible. Otherwise the construction is substantially the same and functions in the same manner as the construction disclosed in Fig. 1. However, it will be noted that, in this form of the invention, the valve 24' is arranged within a dome 29 on casing 13 and is actuated by a float which may be of any desired construction, but, as illustrated, is a ball float 25' as distinguished from the substantially flattened form of float illustrated in Fig. 1.

The invention, as embodied in both forms disclosed provides a gasoline dispensing system entirely automatic in operation, and in which the gasoline is delivered under a substantially constant air pressure without possibility of the passage of air through the registering meter, thus providing a system which, though comparatively simple in construction and automatic in operation, entirely overcomes the objection to systems of this general character now in use, in that it positively precludes the passage of air with the gasoline through the meter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A liquid dispensing system comprising a closed delivery and fluid separating tank containing liquid and gaseous fluid under pressure, a liquid dispensing pipe connected to said tank beneath the liquid level and supplied with liquid under pressure in said tank, a meter connected to said dispensing pipe, a pump within said tank to pump liquid and gaseous fluid into said tank to maintain a sufficient pressure to cause flow through said dispensing pipe, and automatically operating mechanism to discharge excess gaseous fluid from said tank independently of said dispensing pipe.

2. The invention as defined in claim 1 wherein said automatically operating mechanism includes a gaseous fluid vent for said tank, a valve to control flow of gaseous fluid through said vent, and a float in said tank and connected to said valve to open said valve when the volume of gaseous fluid exceeds a predetermined value.

3. The invention as defined in claim 1 including means to cause operation of said pump to cause flow of liquid and gaseous fluid into said tank when the pressure in the tank drops upon opening of the valve controlling flow through said vent.

4. A liquid dispensing system comprising a delivery and separating tank, pumping means in said tank to set up a flow of liquid into said tank causing a building up of gaseous fluid pressure in said tank, a delivery line separate from said pumping means and opening into said tank beneath the liquid level therein to withdraw liquid under pressure of gaseous fluid in the tank, and mechanism actuated upon variations in gaseous fluid pressure in the tank below a predetermined value to automatically actuate said pumping means and to arrest said pumping means when pressure is restored to said valve.

In testimony whereof I affix my signature.

HARRY G. WEYMOUTH.